J. B. PERKINS.
AUTOMATIC VALVE.
APPLICATION FILED JUNE 8, 1904.

974,424.

Patented Nov. 1, 1910.

Witnesses.

Inventor.
John B. Perkins
by Jas. H. Churchill
Atty.

THE NORRIS PETERS CO., WASHINGTON, D. C.

UNITED STATES PATENT OFFICE.

JOHN B. PERKINS, OF REVERE, MASSACHUSETTS.

AUTOMATIC VALVE.

974,424.    Specification of Letters Patent.    Patented Nov. 1, 1910.

Application filed June 8, 1904. Serial No. 211,582.

*To all whom it may concern:*

Be it known that I, JOHN B. PERKINS, a citizen of the United States, residing in Revere, in the county of Suffolk and State of Massachusetts, have invented an Improvement in Automatic Valves, of which the following description, in connection with the accompanying drawings, is a specification, like letters on the drawings representing like parts.

This invention relates to an automatic stop valve for use on steam boilers, and has for its object to provide a simple, inexpensive and efficient valve for the purpose specified. For this purpose the valve casing is provided with an inclined valve seat, with the upper surface of which coöperates an inclined valve which is raised from its seat by the steam pressure in the boiler under normal conditions, and which is closed when the pressure of the steam in the boiler falls below a predetermined point.

The valve is provided on its lower surface with a stem, preferably in the form of a plunger, which is designed to enter a cylinder or pocket closed at its lower end, the said valve stem having one or more channels which extend longitudinally of the said stem and for the best results are made tapering with the apex near the upper end of the said stem so as to effect a gradual closing of the valve.

These and other features of this invention will be pointed out in the claim at the end of this specification.

Figure 1:
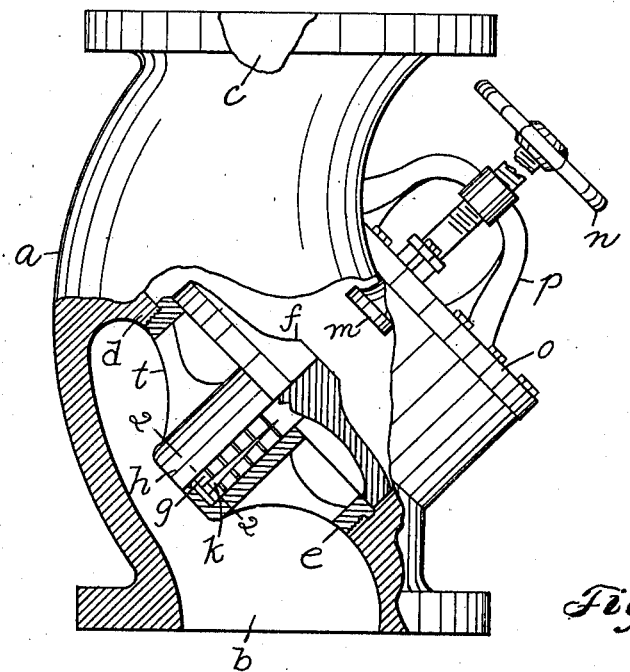
Figure 2:
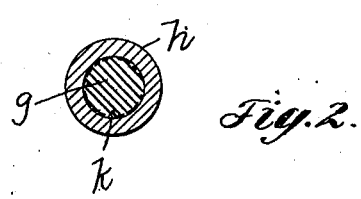

Figure 1 represents in elevation with parts broken away, an automatic stop valve embodying this invention, and Fig. 2, a detail in section on the line 2—2, Fig. 1.

Referring to the drawings, $a$ represents a valve casing provided at its lower end with an inlet port or opening $b$ and at its upper end with an outlet port or opening $c$. The casing $a$ is provided within it with an inclined partition $d$ having an opening in it, into which is fitted an annular ring $e$ constituting a valve seat for a valve $f$. The valve seat $e$ may be provided with screw-threads to engage screw-threads in the wall of the opening in the partition $d$. The valve $f$ is provided on its underside with a stem $g$, preferably cylindrical in shape, and which is designed to enter a pocket or cylinder $h$, secured to the valve seat, as herein shown, by the spokes or arms $t$.

The valve $f$ is raised from its seat by the pressure of the steam acting against its underside, when said pressure equals or exceeds a predetermined amount, and when said steam pressure falls below said predetermined amount, the valve is closed by gravity as herein shown.

The valve stem $g$ is provided with one or more channels $k$ (see Figs. 1 and 2), which extend longitudinally of said stem and are preferably made tapering as shown, with the apex of the channel near the upper part of the valve stem. The channel $k$ affords an entrance for steam into the cylinder or pocket, and an exit for any water of condensation which may accumulate therein.

The steam and water in the cylinder or pocket $h$ serve as a cushion for the valve when the latter is moved to its seat, and the tapering form of the channel $k$ insures a gradual displacement of the water of condensation, thereby insuring a gradual closing of the valve.

The upward movement of the valve may be limited by an adjustable stop, herein shown as a rod $m$ provided at one end with a hand wheel $n$ and having its other end extended into the valve casing $a$, through a cover $o$ for an opening in the side of the casing through which the valve $f$ may be inserted into and removed from said casing. The stop rod $m$ is provided with screw-threads and is revolubly supported in a yoke $p$ attached to the cover $o$, and by turning the handle $n$, the end of the rod within the casing may be brought toward or removed from the valve to regulate the amount said valve should be opened by the steam pressure. The rod $m$ may also serve to positively close the valve $f$ and keep it in its closed position when so desired.

The operation of the automatic valve may be readily understood from inspection of Fig. 1, wherein the valve is shown in its closed position. Assuming, however, that the steam inlet port or opening $b$ is connected with a boiler which is to be safeguarded by the automatic valve. When the pressure of the steam in the boiler equals or exceeds a predetermined amount, which is determined in the present instance by the weight of the valve, the latter is lifted from its seat and kept in its elevated position as long as the steam pressure in the boiler is maintained at the predetermined amount. If for any reason, the pressure in the boiler should fall below the predetermined point, the valve will be seated substantially in an instant and entrance of steam from another boiler in a battery of boilers is prevented.

The valve seat $e$ is of greater diameter than the diameter of the inlet and outlet ports $b$, $c$, so that when it is placed in its inclined position, shown in the drawing, a substantially straight passage of substantially uniform width is afforded for the passage of the fluid through the valve casing. It is also to be noted that the pocket or receptable $h$ is closed at its bottom and sides and open only at its top, and that exit for the steam or fluid in the pocket below the valve stem is afforded by the tapering channel $k$ which extends in the direction of the length of the pocket or receptacle and may be made in the valve stem as shown or on the inner surface of the side walls of the receptacle or pocket.

The tapering channels $k$ are made substantially fine or narrow so as to insure a cushioning effect on the valve and prevent the latter being seated with sufficient force as to injure not only the valve but also its seat.

Claim.

In a valve of the character described, in combination, a valve casing provided with an outlet and an inlet port, a valve seat intermediate said ports, a valve of greater area than said seat movable bodily toward and from said seat, a solid plunger attached to the underside of said valve, a cylinder of smaller diameter than said valve seat and into which said plunger is adapted to enter, radially extended arms connecting the valve seat and cylinder, said cylinder being closed at its bottom and sides and open at its top, and said plunger having a substantially narrow tapering channel on its exterior to form a restricted outlet for the cylinder and thereby cushion the valve in its closing movement, substantially as described.

In testimony whereof, I have signed my name to this specification in the presence of two subscribing witnesses.

JOHN B. PERKINS.

Witnesses:
 JAS. H. CHURCHILL,
 J. MURPHY.